No. 642,687. Patented Feb. 6, 1900.
W. R. FOX.
SASH CORD GUIDE.
(Application filed Feb. 23, 1898.)
(No Model.)
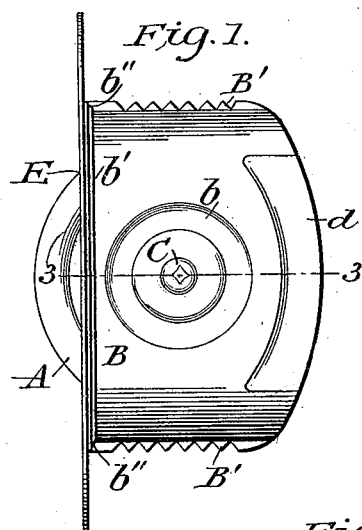
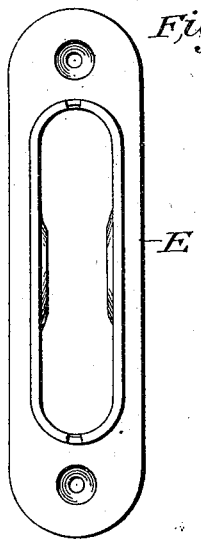
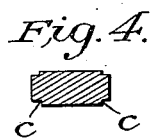
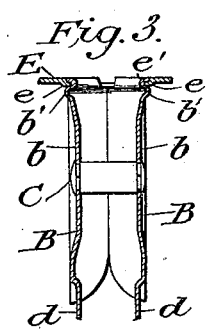
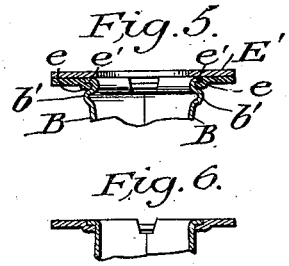
Witnesses.
Inventor.
WILLIAM R. FOX

UNITED STATES PATENT OFFICE.

WILLIAM R. FOX, OF GRAND RAPIDS, MICHIGAN.

SASH-CORD GUIDE.

SPECIFICATION forming part of Letters Patent No. 642,687, dated February 6, 1900.

Application filed February 23, 1898. Serial No. 671,325. (No model.)

*To all whom it may concern:*

Be it known that I, WILLIAM R. FOX, a citizen of the United States, residing at Grand Rapids, county of Kent, and State of Michigan, have invented certain new and useful Improvements in Sash-Cord Guides, of which the following is a specification.

My invention relates to improvements in sash-cord pulleys and shells composed of sheet metal, the object of the invention being to provide a construction which may be produced at an extremely low cost by stamping from sheet metal and in which all necessity of rivets for securing the parts together is dispensed with, the pulley-axle serving as the sole connecting-rivet.

The invention is illustrated in the accompanying drawings, in which—

Figure 1 is a side elevation. Fig. 2 is a face view of the same. Fig. 3 is a section on line 3 3 of Fig. 1, and Fig. 4 is a detailed sectional view of the pulley-axle. Figs. 5 and 6 are views of a modification.

The pulley shown at A may be of the ordinary or any desired construction. The casing in which it is journaled is composed of two sections or halves B B, which are precisely alike in shape and are struck from a suitable sheet-metal blank. Each half or section is preferably provided approximately centrally thereof with a circular depression or concavity, as shown at $b$, having an angular hole to receive the end of the axle C, and may also be provided with a depression $d$, extending almost the whole length of the side, both of these depressions being for the purpose of strengthening and bracing the shell. The sides are curved inwardly at each end until in contact with each other, at which point they are provided with parallel flanges B', forming a broader bearing and preventing the slipping of the edges one from the other. These abutting flanges are cut or otherwise formed into saw-teeth, which serve to cut their way as the shell is driven into the wood, thereby preventing it from slipping. While these bearing-flanges form a comparatively broad and firm bearing between the halves or sections, it will be observed that there is no rivet connection at this point, the pulley-axle forming the binding connection between the body portions of the sections. The axle, as will be observed more particularly from Fig. 4, is provided with a reduced portion at each end forming shoulders $c$, the reduced portions being angular to correspond with the angular holes in the sections, and it will be observed that by reason of the shoulders and the angular shape of the reduced portions and holes when the ends of the rivet are headed or upset upon the sides a very firm and secure connection is provided between the sections.

Each section has a rib or bead $b'$, formed by rolling or pressing out the metal at a slight distance below the upper edge thereof, which forms a seat for a facing-plate E, which rests upon this bead and upon shoulders $b''$, formed by cutting away the upper portions of the flanges B'. The facing-plate E is provided with a central opening corresponding in shape to the exterior of the shell, so that it can be slipped down until the edge of the opening rests upon the bead $b'$, as before stated, and the edge of this opening is swaged or depressed downwardly, as shown at $e$, to form a seat into which the upper edges of the sections are rolled, as shown at $e'$. This forms a very secure locking-joint and at the same time maintains a perfectly flat surface. Holes are provided in the plate for the necessary fastening nails or screws.

If desired, a supplemental plate E' may be provided, as shown in Fig. 5, for the purpose of giving a better finish and making it as large and heavy as necessary to suit the requirements of the work.

If desired, the bead $b'$ may be omitted, as shown in Fig. 6.

Having thus described my invention, what I claim is—

1. In combination, the sections having inwardly-turned ends provided with abutting flanges, said flanges being cut away at the upper ends to form shoulders, beads carried by said sections in line with said shoulders, and a face-plate resting against said beads and shoulders, substantially as described.

2. In combination, the sections, beads near the upper edges thereof, the face-plate having an open center with a downwardly-struck edge resting against said beads, the upper edges of the sections being turned over against the downwardly-struck edge of the face-plate, and a second face-plate covering said first face-plate and overturned edge, substantially as described.

3. In combination the side sections having inwardly-turned edges provided with abutting flanges, said flanges being cut away near the top to provide shoulders, the face-plate encircling the upper edges of the sections and resting against said shoulders, and the pulley and axle, substantially as described.

In testimony whereof I affix my signature in presence of two witnesses.

WILLIAM R. FOX.

Witnesses:
 GEORGE S. MILLER,
 JOHN G. LINDNER.